United States Patent Office 3,522,317
Patented July 28, 1970

3,522,317
METHOD OF PREPARING 3-HYDROXY ALDEHYDES AND KETONES AND THEIR ACETALS
Siegfried H. Schroeter, Schenectady, N.Y., assignor to General Electric Company, a corporation of New York
No Drawing. Filed May 29, 1968, Ser. No. 732,853
Int. Cl. C07c 41/06
U.S. Cl. 260—611                           5 Claims

ABSTRACT OF THE DISCLOSURE

3 - hydroxy substituted acetals are produced by the reaction of 2-alkoxyoxetanes with alcohols. The 3-hydroxy-acetals can be converted into 3-hydroxy-carbonyl derivatives by hydrolysis employing aqueous inorganic acids, and then into $\alpha,\beta$-unsaturated carbonyl compounds by heating the acid solution. The $\alpha,\beta$-unsaturated aldehydes, ketones or esters can be polymerized to give polycarbonyl compounds such as polyacrylates. The acetals can also be copolymerized with ethylene, maleic anhydride, or esters of maleic acid to produce copolymers in the form of films, etc., useful for packaging.

---

This invention is concerned with a process for producing 3-hydroxy aliphatic aldehydes and ketones and their acetals by the hydrolysis or alcoholysis of 2-hydrocarbonoxyoxetanes.

In accordance with the process of the present invention, a 2-hydrocarbonoxyoxetane having the general formula, (I)
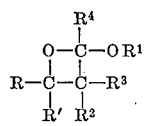

(II)
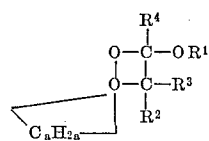

wherein R is a member of the class consisting of alkyl groups containing from 1 to 10 carbon atoms and aryl groups containing up to 12 carbon atoms and R' is hydrogen or an R group, $R^1$ is a monovalent hydrocarbon radical or halogenated monovalent hydrocarbon radical, $R^2$, $R^3$, and $R^4$ are hydrogen or an $R^1$ group and $a$ is an integer of from 3 to 13, are admixed with an alcohol of the formula, (III)    R''—OH wherein R'' is an alkyl group containing up to 10 carbon atoms or an aryl group containing up to 12 carbon atoms, and the admixture maintained at a temperature at which said alcohol and said 2-alkoxyoxetane react to produce 3-hydroxy-acetals having the general formulas (IV)
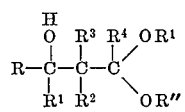

(V)
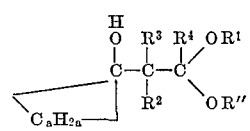

wherein R, R', R'', $R^1$, $R^2$, $R^3$ and $R^4$ and $a$ have the above defined meanings.

The temperature at which the reaction of this invention takes place is not narrowly critical and can vary from as low as 25° C. to as high as 150° C. or even higher. Inasmuch as the reaction rate is slower at the lower temperatures, it is preferred to maintain the reaction mixture at from 50° C. to 125° C. which is the boiling point range of the lower alcohols employed in the process of this invention. Temperatures higher than the reflux temperature of the mixture can be employed by employing higher pressure; however, no commensurate advantages are obtained thereby. The presence of anhydrous acids or proton sources greatly accelerates the reaction so that the lower temperatures can be employed, i.e. 25° C. to 50° C. however, aqueous acids such as hydrochloric acid, etc. cause hydrolysis directly to the carbonyl compounds.

The ratio of the alcohol of Formula III to the alkoxyoxetanes of Formulas I and II employed in the process of this invention is not narrowly critical and can range from as little as 1 to as many as 10 moles or more of the alcohol for each mole of the alkoxyoxetane employed. It is preferred to employ the alcohol in at least a two to one molar ratio in order to insure completeness of reaction and ease of recovery of the reaction products.

A solvent is not necessary in conducting the process of this invention, since normally the excess of the alcohol of Formula III serves as the solvent. A solvent can be employed, however, if desired. Solvents other than the reactants which are useful in conducting the process of this invention are those liquids in which the reactants and the reaction products are soluble and which do not contain groups which would react with the oxetane to give by-products during the course of the reaction. Such solvents will vary with the nature of the oxetane employed and are, for example, pentane, hexane, benzene, diethylether, dibutylether, tetrahydrofurane, N,N - dimethylformamide, N,N - dimethylacetamide, etc. The amount of solvent employed in the process of this invention can vary, by weight, from 10 to 1000 parts of the solvent per 100 parts of the reactants.

The process of the present invention can be conducted at sub-atmospheric, atmospheric or super-atmospheric pressures. It is preferred, for simplicity and ease of operation, to conduct the process at atmospheric pressure and in the liquid phase.

The monovalent hydrocarbon radicals which $R^1$, $R^2$, $R^3$ and $R^4$ represent include alkyl radicals such as, methyl, ethyl, isopropyl, tertiary butyl, octyl, etc.; alkenyl radicals, such as, vinyl, crotyl, allyl, methallyl, decenyl, etc.; cycloalkyl radicals, such as, cyclopentyl, cyclohexyl, etc.; cycloalkenyl radicals, such as, cyclopentenyl, cyclohexenyl, cycloheptenyl, etc.; aryl radicals, such as, phenyl, xenyl, naphthyl, etc.; arylalkyl radicals, such as, benzyl, phenylethyl, phenylpropyl, etc.; alkaryl radicals, such as, tolyl, xylyl, etc. and the halogen derivatives, thereof, which include, chloromethyl, gammachloropropyl, bromocyclohexyl, perfluorovinyl, chlorocyclohexyl, trifluoropropyl, pentafluorobutyl, dibromophenyl, pentachlorophenyl, $\alpha,\alpha,$ $\alpha$-trifluorotolyl, etc.

Illustrative of the oxetanes which can be employed in the process of this invention are, for example, 4,4-dimethyl-2-methoxyoxetane;
4,4-(para-bromo)dephenyl-2-n-butoxyoxetane;
4-methyl-4-ethyl-2-propoxyoxetane;
4,4-diethyl-3,3-dimethyl-2-n-butoxyoxetane;
3,4-dimethyl-2-methoxyoxetane;
3,4-diphenyl-2-methoxyoxetane;
4,4-dimethyl-2-iso-butoxyoxetane;
3-ethyl-4-phenyl-2-n-butoxyoxetane;
4-phenyl-3-methyl-2-ethoxyoxetane;
4-(para-bromo)phenyl-3-methyl-2-ethoxyoxetane;

2-methoxy-1-oxaspiro[3.5]nonane;
3-(para-chloro)phenyl-2-ethoxy-1-oxaspiro[3.5]nonane;
2-methoxy-1-oxaspiro[3.7]undecane;
2,3,3-trimethyl-2-methoxy-1-oxaspiro[3.11]pentadecane;
2-methyl-2-methoxy-1-oxaspiro[3.5]nonane;
2-n-butoxy-1-oxaspiro[3.4]octane;
2,3-dimethyl-2-ethoxy-oxaspiro[3.5]nonane;
3-phenyl-2-isobutoxy-oxaspiro[3.6]decane;
2-methoxy-1-oxaspiro[3.8]dodecane; etc.

The above 2-hydrocarbonoxyoxetanes are produced in accordance with the process described in copending applications Ser. No. 671,576 filed Sept. 29, 1967 and assigned to the same assignee as the present invention, which application by reference is made a part of the instant application. It is possible to employ directly the mixed reaction products produced in accordance with said copending application inasmuch as 3-alkoxyoxetanes produced in accordance with the aforementioned copending application are not reactive under the conditions of the process of this invention and can be recovered from the reaction products.

Illustrative of the alkyl groups which R, R' and R'' represent are, for example, methyl, ethyl, isopropyl, t-butyl, decyl, undecyl, and the like. Illustrative of the aryl groups which R and R' represent are, for example, phenyl, biphenyl, tolyl, xylyl, naphthyl, etc.

Illustrative of the alcohols of Formula III that can be employed in the process of this invention are the aliphatic alcohols such as, methanol, ethanol, propanol, isopropanol, t-butanol, octanol, butanol, cyclohexanol, neopentyl alcohol, and their related isomers and the aromatic substituted aliphatic alcohols such as benzyl alcohol, phenylethyl alcohol, and their homologs containing up to 8 carbon atoms in the aliphatic chain.

The 3-hydroxy aliphatic acetals produced by the process of this invention are converted into 3-hydroxycarbonyl derivatives such as aldehydes and ketones, by hydrolysis employing aqueous inorganic acids. The 3-hydroxy aldehydes and 3-hydroxy ketones can be converted into α,β-unsaturated aldehydes and ketones by heating the aqueous acid solutions. The α,β-unsaturated aldehydes are oxidized to α,β-unsaturated acids which can be homopolymerized or copolymerized with other ethylenically unsaturated compounds to yield homopolymers and copolymers which are useful as electrical insulation, as protective film, e.g. paints, etc. The 3-hydroxy-acetals can also be converted to α,β-unsaturated acetals by heating in the presence of an inorganic acid. The α,β-unsaturated acetals can be co-polymerized with ethylene, maleic anhydride, or esters of maleic acid employing free radical catalysts to produce thermoplastic copolymers which are useful as protective films, ion exchange membranes, etc.

The oxetanes of Formula I or II can be converted directly to the corresponding 3-hydroxy alkyl aldehyde or ketone derivative by substituting water for the alcohol in the process of this invention. The reaction takes place upon mixing and no heat or catalyst such as dilute aqueous acids or dilute aqueous bases need be employed.

By this method and by hydrolysis of the acetals one produces hydroxy-carbonyl compounds of the formulas, (VI) 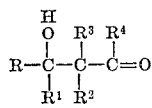

and (VII) 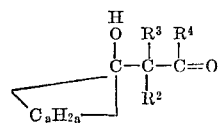

wherein R, R', $R^2$, $R^3$, $R^4$, and $a$ are as above defined.

The following examples serve to further illustrate this invention. In the examples, all parts and percents are by weight unless otherwise stated.

EXAMPLE 1

A mixture (60 grams) consisting of 27% by weight of 4,4-dimethyl-2-ethoxyoxetane and 63% by weight of 2,2-dimethyl-3-ethoxyoxetane was dissolved in 150 milliliters of absolute ethanol. The solution was refluxed at approximately 80° C. for 12 hours. Vapor phase chromatographic analysis showed that all of the 2-ethoxy isomer had been converted into a compound of high retention time. The ethanol was evaporated off and the residue distilled yielding 23.17 grams of pure 2,2-dimethyl-3-ethoxyoxetane (B.P. 65° C./57 mm. Hg, $n_D^{20}$ 1.4105) and 20.7 grams of pure 3-methyl-3-hydroxybutyraldehyde diethylacetal (B.P. 72° C./7 mm. Hg, $n_D^{20}$ 1.4195), which had the following analysis:

Calculated: mol. wt., 176.25 (percent): C, 61.33; H, 11.44. Found (percent): mol. wt., 180; C, 61.35; H, 11.65.

EXAMPLE 2

Sixty grams of a mixture consisting of 30% by weight of 4,4-dimethyl-2-n-butoxyoxetane and 70% by weight of 2,2-dimethyl-3-n-butoxyoxetane was dissolved in 120 ml. of dry n-butanol. The resultant solution was refluxed at 117° C. for three hours. Vapor phase chromatographic analysis showed the mixture to contain 62% of the 3-n-butoxy isomer and 38% by weight of a compound of higher retention time. The alcohol was evaporated off and the residue distilled through a spinning band column yielding 30.55 grams of 2,2-dimethyl-3-n-butoxyoxetane (B.P. 64° C./10 mm. Hg, $n_D^{20}$ 1.4195) and 21.6 grams of 3-methyl-3-hydroxybutyraldehyde di-n-butyl acetal (B.P. 61° C./0.05 mm. Hg, $n_D^{20}$ 1.4305).

The di-n-butyl acetal gave the following analysis:
Calculated: mol. wt., 232.35; C, 67.19%; H, 12.15%.
Found: mol. wt., 240; C, 67.5%; H, 12.2%.

EXAMPLE 3

A mixture (30 grams) consisting of 45% 4,4-dimethyl-2-isobutoxyoxetane and 55% 2,2-dimethyl-3-isobutoxyoxetane were dissolved in dry isobutanol (200 cc.). The solution was then refluxed for six hours. Fractionation of the resultant reaction product through a spinning band column yielded 18.62 grams of the diisobutyl acetal of 3-methyl-3-hydroxybutyraldehyde (B.P. 60° C./0.05 mm. Hg, $n_D^{20}$ 1.4274). The di-isobutyl acetal gave the following analysis:

Calculated: mol. wt., 232.35; C, 67.19%; H, 12.15%.
Found: mol. wt., 230; C, 67.27%; H, 11.93%.

EXAMPLE 4

Sixty grams of a mixture of 2-ethyl-3-ethoxyoxetanes and 4-ethyl-2-ethoxyoxetanes produced by the ultraviolet irradiation of a mixture of propionaldehyde and ethyl vinyl ether was dissolved in absolute ethanol (250 grams). The solution was refluxed for 10 hours. The reaction mixture was distilled through a spinning band column yielding 43 grams of 2-ethyl, 3-ethoxyoxetanes (B.P. 63° C. to 65° C./28 mm. Hg) and 12.94 grams of 3-hydroxyvaleraldehyde diethylacetal (B.P. 42° C./0.05 mm. Hg $n_D^{20}$ 1.4242). Analysis of the 3-hydroxyvaleraldehyde diethylacetal gave the following results:

Calculated: mol. wt., 176.25; C, 61.33%; H, 11.44%.
Found: mol. wt., 180; C, 61.12%; H, 11.41%.

EXAMPLE 5

A solution of 75 grams of a mixture containing 29% of 2- and 71% of 3-ethoxy-1-oxaspiro[3.5]nonane dissolved in 200 ml. of absolute ethanol was refluxed for two hours at 78° C. Evaporation of the ethanol in vacuo and distillation of the residue yielded 51.96 grams of pure 3-ethoxy-oxaspiro[3.5]nonane (B.P. 65° C./2.5 mm. Hg, $n_D^{20}$ 1.4559) and 19 grams of 3-cyclohexyl-3-hydroxyacetaldehyde diethylacetal (B.P. 56–57° C./0.05 mm. Hg, $n_D^{20}$ 1.4522). Analysis of the diethylacetal gave the following results:

Calculated: mol. wt., 216.31; C, 66.63%; H, 11.18%.
Found: mol. wt., 210; C, 66.8%; H, 11.3%.

EXAMPLE 6

A solution of a mixture of oxetanes (73 grams) produced by the ultraviolet irradiation of benzaldehyde in the presence of ethyl vinyl ether was dissolved in 250 ml. of absolute ethanol and the solution refluxed at 80° C. for 12 hours. Distillation of the reaction product yielded a mixture of oxetanes and 17.8 grams of 3-phenyl-3-hydroxypropionaldehyde diethylacetal (B.P. 86° C./0.04 mm. Hg, $n_D^{20}$ 1.4934). The identity of the diethylacetal was confirmed by infrared analysis and nuclear magnetic resonance spectral analysis. Elemental analysis of the diethylacetal gave the following results:

Calculated: mol. wt., 224; C, 69.91%; H, 8.89%.
Found: mol. wt., 226; C, 69.79%; H, 9.10%.

EXAMPLE 7

A mixture (55 grams) consisting of 28% of 4,4-dimethyl-2-ethoxyoxetane and 72% of 2,2 - dimethyl-3-ethoxyoxetane was dissolved in 200 ml. of n-butanol. The solution was refluxed for 24 hours at 117° C. Distillation of the reaction product through a spinning band column yielded 17.07 grams of 3 - methyl-3-hydroxybutyraldehyde ethyl n-butyl acetal (B.P. 51° C./0.1 mm. Hg, $n_D^{20}$ 1.4257). Identity of the acetal was confirmed by infrared and nuclear magnetic resonance spectral analysis. Reaction of 4,4-dimethyl-2-n-butoxyoxetane with ethanol gave the same 3-methyl-3-hydroxybutyraldehyde ethyl n-butyl acetal (B.P. 53° C./0.2 mm. Hg, $n_D^{20}$ 1.4257). Elemental analysis of the acetal yielded the following results:

Calculated: mol. wt., 204.30; C, 64.66%; H, 11.84%.
Found: mol. wt., 206; C, 64.79%; H, 11.92%.

EXAMPLE 8

A mixture (50 grams) consisting of 21% of 4,4-dimethyl-2-n-butoxyoxetane and 79% of 2,2-dimethyl-3-n-butoxyoxetane was dissolved in 250 ml. of absolute ethanol. The solution was refluxed for 24 hours at 78° C. Distillation of the reaction product through a spinning band column afforded a major oxetane fraction boiling at 65° C./135 mm. Hg and 11.76 grams of 3-methyl-3-hydroxybutyraldehyde ethyl n-butyl acetal (B.P. 53° C./0.2 mm. Hg, $n_D^{20}$ 1.4257). The identity of the acetal was confirmed by nuclear magnetic resonance and infrared spectral analysis. Elemental analysis of the acetal gave the following results:

Calculated: mol. wt., 204.30; C, 64.66%; H, 11.84%.
Found: mol. wt., 196; C, 64.42%; H, 11.61%.

EXAMPLE 9

A mixture (60 grams) consisting of 28% of 4,4-dimethyl-2-ethoxyoxetane and 72% of 2,2-dimethyl-3-ethoxyoxetane was dissolved in 250 ml. of dry tertiary butanol. The solution was refluxed at 82° C. for 24 hours. Distillation of the reaction product through a spinning band column afforded 21.4 grams of 3-methyl-3-hydroxybutyraldehyde ethyl-t-butyl acetal (B.P. about 41° C./0.1 mm. Hg, $n_D^{20}$ 1.4245). The identity of the acetal was confirmed by infrared and nuclear magnetic resonance spectral analysis. Elemental analysis of the acetal gave the following results:

Calculated: mol. wt., 204.30; C, 64.66%; H, 11.84%.
Found: mol. wt., 204; C, 64.71%; H, 11.84%.

EXAMPLE 10

A mixture (65 grams) consisting of 20% of 4,4-dimethyl-2-ethoxyoxetane and 80% of 2,2-dimethyl-3-ethoxyoxetane and phenol (20 grams) was dissolved in 250 ml. of diethyl ether and refluxed at 35° C. for 8 hours. The reaction product was extracted several times with a 10% sodium hydroxide solution in water and brine and dried over magnesium sulfate. Distillation through a spinning band column yielded 17.16 grams of 3-methyl-3-hydroxybutyraldehyde ethyl phenyl acetal (B.P. 97° C./0.3 mm. Hg, $n_D^{20}$ 1.4546). The identity of the acetal was confirmed by infrared and nuclear magnetic resonance spectral analysis. Elemental analysis of the acetal gave the following results:

Calculated: mol. wt., 224.29; C, 69.61%; H, 8.99%.
Found: mol. wt., 228; C, 69.85%; H, 9.17%.

EXAMPLE 11

A mixture (60 grams) containing 20% of 4,4-dimethyl-2-ethoxyoxetane and 80% of 2,2-dimethyl-3-alkoxyoxetane was shaken with 200 ml. of water for 15 min. The mixture warmed considerably during this period. The organic phase was taken up with diethyl ether. Vapor phase chromatographic analysis indicated that most of the 2-ethoxyoxetane had reacted and was present in the aqueous layer. The aqueous layer was evaporated in vacuo to afford, after distillation, 4.0 grams of β-methyl-crotonaldehyde, B.P. ca 50° C./5 mm. Hg, which crystallized upon standing.

It will, of course, be apparent to those skilled in the art that modifications other than those set forth in the above examples can be employed in the process of this invention without departing from the scope thereof. For example, oxetanes of Formulas I and II, other than those given in the examples and alcohols of Formula III, other than those given in the examples can be substituted for the oxetanes and alcohols employed in the examples to yield various 3-hydroxy substituted acetals in accordance with the process of this invention.

What is claimed is:

1. A process for the production of 3-hydroxy acetals of the formulas,

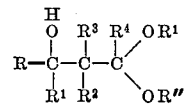

or

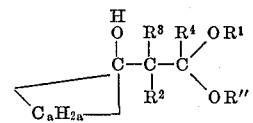

wherein R is a member of the class consisting of alkyl groups containing from 1 to 10 carbon atoms and aryl groups containing up to 12 carbon atoms and R' is hydrogen or an R group, R" is an alkyl group containing up to 10 carbon atoms or an aryl group containing up to 12 carbon atoms, $R^1$ is a monovalent hydrocarbon radical or halogenated monovalent hydrocarbon radical and $R^2$, $R^3$, and $R^4$ are hydrogen or an $R^1$ group and $a$ is an integer of from 3 to 13 which comprises forming an admixture of an alcohol having the formula,

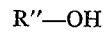

wherein R" is as above defined with an oxetane having the formula,

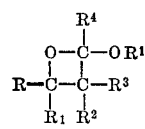

or

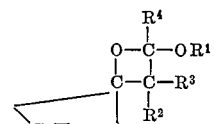

wherein R, R', $R^1$, $R^2$, $R^3$, and $R^4$ and $a$ are as above defined, and maintaining said admixture at a temperature between 25° C. and 150° C.

2. A process as in claim 1 wherein the oxetane is 2-ethoxy-1-oxaspiro[3.5]nonane and the alcohol is ethanol.

3. A process as in claim 1 wherein the oxetane is 2-ethoxy-4-ethyl oxetane and the alcohol is ethanol.

4. A process as in claim 1 wherein the oxetane is 4,4-dimethyl-2-ethoxyoxetane.

5. A process as in claim 1 wherein the oxetane is 4,4-dimethyl-2-isobutoxyoxetane and the alcohol is isobutanol.

References Cited

UNITED STATES PATENTS 2,778,855   1/1957   Shokal _____ 260—615

OTHER REFERENCES

Bergman et al., Berichte, vol. 64 (1931), pp. 802–804.
Aston et al., —JACS, vol. 62 (1940), pp. 2590–2595.
Paquin, Epoxydverbindungen und Epoxydharze (1958), p. 2.

BERNARD HELFIN, Primary Examiner

U.S. Cl. X.R.

204—158; 260—613, 615, 598, 600, 602, 586, 594, 590, 514, 523, 89.3, 91.1